US006204483B1

(12) United States Patent
Fair et al.

(10) Patent No.: US 6,204,483 B1
(45) Date of Patent: Mar. 20, 2001

(54) HEATING ASSEMBLY FOR RAPID THERMAL PROCESSING SYSTEM

(75) Inventors: James E. Fair, Livermore; Fritz B. Harris, Rocklin, both of CA (US)

(73) Assignee: Intevac, Inc., Santa Clara, CA (US)

( * ) Notice: Subject to any disclaimer, the term of this patent is extended or adjusted under 35 U.S.C. 154(b) by 0 days.

(21) Appl. No.: 09/344,311

(22) Filed: Jun. 24, 1999

Related U.S. Application Data

(60) Provisional application No. 60/091,338, filed on Jul. 1, 1998.

(51) Int. Cl.[7] .............................. F27B 9/24; F27B 9/36; F27B 9/40; C03B 25/08
(52) U.S. Cl. .................. 219/388; 219/411; 219/413; 219/483; 219/494; 219/486; 65/118; 65/162; 374/124
(58) Field of Search ........................... 219/388, 411, 219/413, 483, 486, 494, 508; 392/411, 414; 65/114, 118, 162; 118/725, 728, 729; 374/121, 124, 130

(56) References Cited

U.S. PATENT DOCUMENTS

| | | | |
|---|---|---|---|
| 3,744,985 | * 7/1973 | Peternel ................................ 65/118 |
| 4,712,086 | * 12/1987 | Reunamaki et al. ................. 338/315 |
| 4,824,464 | * 4/1989 | Perin et al. ............................ 65/114 |
| 4,840,496 | * 6/1989 | Elleman et al. ..................... 374/124 |
| 5,053,604 | * 10/1991 | Escaravage et al. ................. 219/483 |
| 5,073,698 | * 12/1991 | Stultz .................................... 219/411 |
| 5,122,180 | * 6/1992 | Mathivat et al. ...................... 65/162 |
| 5,337,393 | * 8/1994 | Reunamaki ............................ 65/118 |
| 5,831,248 | * 11/1998 | Hojyo et al. ......................... 219/388 |
| 5,864,119 | * 1/1999 | Vogt et al. ........................... 219/388 |
| 5,876,198 | * 3/1999 | Olah et al. ........................... 219/388 |

* cited by examiner

*Primary Examiner*—Joseph Pelham
(74) *Attorney, Agent, or Firm*—Stanley Z Cole; William McClellan

(57) ABSTRACT

A rapid thermal processing system for large area substrates, such as glass panels for flat panel displays, includes a processing chamber, a transport assembly for transporting a substrate through the processing chamber, and a heating assembly for heating the substrate. The heating assembly includes a bank of elongated heating elements disposed in the processing chamber. The heating elements have longitudinal axes aligned with the substrate transport direction. In one embodiment, heating elements on one side of the substrate have longitudinal axes aligned perpendicular to the substrate transport direction and heating elements on the opposite side of the substrate have longitudinal axes aligned parallel to the substrate transport direction.

7 Claims, 11 Drawing Sheets

HEATING ASSEMBLY FOR RAPID THERMAL PROCESSING SYSTEM

CROSS REFERENCE TO RELATED APPLICATION

This application claims the benefit of provisional application Ser. No. 60/091,338 filed Jul. 1, 1998.

FIELD OF THE INVENTION

This invention relates to methods and apparatus for rapid thermal processing of large area substrates, such as glass panels for flat panel displays, and, more particularly, to heating assemblies for rapid thermal processing systems.

BACKGROUND OF THE INVENTION

Systems for rapid thermal processing of glass panels for flat panel displays are known in the art. Such systems include a heating assembly and a transport assembly within an enclosure. Glass panels having one or more coatings enter the system in a horizontal orientation and are transported through the system on rotating quartz cylinders. The glass panels pass through a series of preheating zones at increasing temperatures. The preheating zones contain infrared heaters that are oriented perpendicular to the direction of movement of the glass panels. The panels then move through a region where they are exposed to intense ultraviolet radiation supplied by a xenon arc lamp mounted in a reflector. The panels then move through a cooling zone and exit the system at the end opposite the first preheating zone.

An important parameter in the operation of rapid thermal processing systems is temperature uniformity across the surface of the glass panel or other substrate. Prior art systems have provided generally satisfactory performance but have had certain drawbacks.

The system requires a non-contact temperature measurement technique. An optical pyrometer, which measures temperature based on sensed infrared energy, is typically utilized. The conventional prior art approach is to mount a pyrometer sensing head in a fixed position such that a line profile at one location along the direction of workpiece motion is produced. This configuration has limited temperature measurement capability and thus limits the ability to achieve uniform heating.

Prior art rapid thermal processing systems typically utilize long filament infrared heaters positioned at 90° to the direction of glass panel movement. This arrangement produces excellent longitudinal uniformity, but limited lateral uniformity due to edge effects. It is therefore desirable to provide a lamp configuration having improved lateral heating uniformity. Lateral uniformity refers to uniformity in a direction perpendicular to the direction of substrate movement.

As noted above, glass panels typically enter the rapid thermal processing system at one end and exit at the opposite end. The distance between the entrance end and the exit end increases as the dimensions of the glass panels being processed increases. This distance may be unacceptable in some fabrication facilities.

A method for selectively heating a film on a substrate, such as a glass substrate for a flat panel display, is disclosed in U.S. Pat. No. 5,073,698 issued Dec. 17, 1991 to Stultz. A semiconductor wafer heating chamber, including an optical element between a light source and a wafer and an optical pyrometer for measuring wafer heating, is disclosed in U.S. Pat. No. 4,755,654 issued Jul. 5, 1988 to Crowley et al. A long arc lamp for semiconductor wafer heating is disclosed in U.S. Pat. No. 4,820,906 issued Apr. 11, 1989 to Stultz.

All of the known prior art rapid thermal processing systems have had one or more of the drawbacks discussed above. Accordingly, there is a need for improved methods and apparatus for rapid thermal processing of large area substrates.

SUMMARY OF THE INVENTION

According to a first aspect of the invention, a rapid thermal processing system for large area substrates is provided. The rapid thermal processing system comprises a processing chamber, a transport assembly for transporting a substrate through the processing chamber in a substrate transport direction, and a heating assembly for heating the substrate. The heating assembly comprises a bank of elongated heating elements disposed in the processing chamber. The heating elements having longitudinal axes aligned with the substrate transport direction.

The heating elements may have lengths equal to or greater than the length of the substrate in the substrate transport direction. The bank of heating elements may be disposed above the substrate and may extend laterally beyond the edges of the substrate.

The rapid thermal processing system may further comprise a control system for supplying controlled electrical energy to the heating elements. The control system may comprise means for individually controlling the electrical energy supplied to each of the heating elements. The control system may comprise a temperature sensor for sensing a temperature of the substrate and a heating element controller for supplying electrical energy to the heating elements in response to a difference between a sensed temperature profile of the substrate and a desired temperature profile. The control system may further comprise a carriage assembly for scanning the temperature sensor laterally with respect to the substrate to provide a lateral temperature profile.

According to another aspect of the invention, a rapid thermal processing system for large area substrates is provided. The rapid thermal processing system comprises a processing chamber, a transport assembly for transporting a substrate through the processing chamber in a substrate transport direction, and a heating assembly for heating the substrate. The heating assembly comprises first and second banks of the elongated heating elements disposed in the processing chamber on opposite sides of the substrate. The heating elements of at least one of the first and second banks have longitudinal axes aligned with the substrate transport direction. In one embodiment, the heating elements of the first bank have longitudinal axes aligned perpendicular to the substrate transport direction and the heating elements of the second bank have longitudinal axes aligned parallel to the substrate transport direction.

BRIEF DESCRIPTION OF THE DRAWINGS

For a better understanding of the present invention, reference is made to the accompanying drawings, which are incorporated herein by reference and in which.

DETAILED DESCRIPTION

Figure 1A:
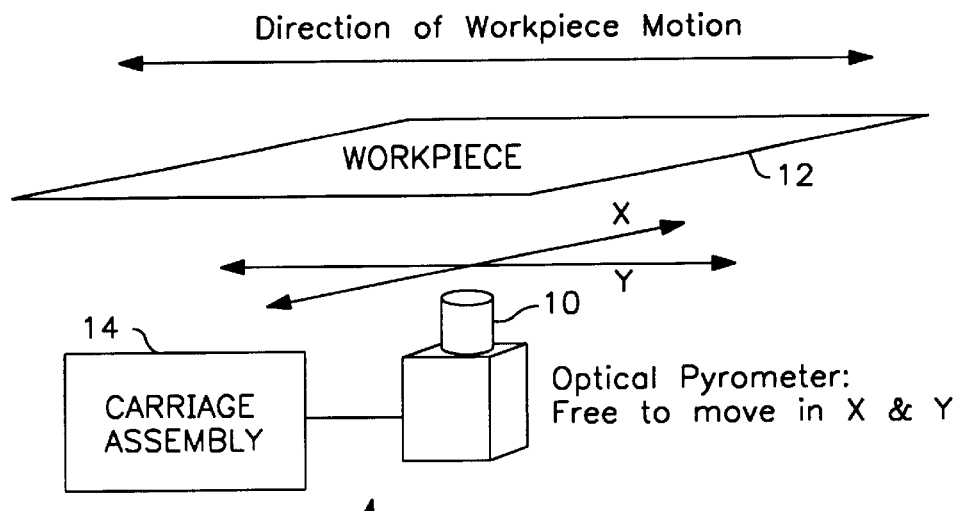
FIG. 1A is a schematic representation of a scanning temperature sensor that is movable in two directions parallel to the plane of the workpiece or substrate.

A rapid thermal processing system for large area substrates may include a temperature sensing assembly comprising a scanning temperature sensor 8, as shown in FIG. 1A. The scanning temperature sensor 8 may include a pyrometer sensing head or other temperature sensor 10 attached to a carriage assembly 14. The temperature sensor 10 is movable in at least one direction, such as perpendicular to the direction of substrate movement, and is preferably movable in two directions (X and Y) in a plane parallel to the surface of a substrate 12 being processed. The scanning temperature sensor 8 permits much more temperature information to be obtained than the prior art static temperature sensor configuration.

Figure 1B:
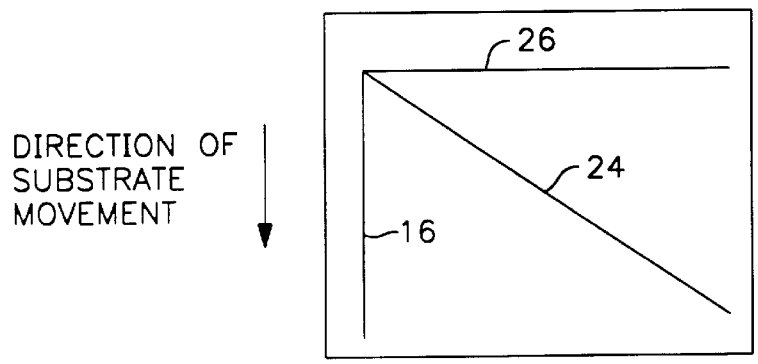
FIGS. 1B and 1C are top views of substrates, illustrating different temperature profiles that can be obtained with the scanning temperature sensor.
Figure 1C:
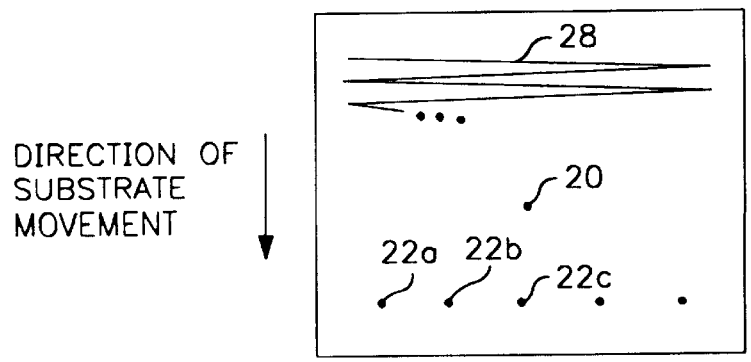

Examples of different temperature profiles that can be obtained with the scanning temperature sensor are shown in FIGS. 1B and 1C. As shown in FIG. 1, the temperature sensor 10 can be moved to an arbitrary location and stopped, and a line temperature profile 16 can be acquired. By moving the sensor 10 along the workpiece motion direction at the same speed as the workpiece, a temperature profile of a point 20 is obtained as a function of time. Other temperature measurement protocols include measuring temperatures at a set of points 22a, 22b, 22c, etc. on the surface of the substrate, scanning slowly across the substrate as it moves through the system to provide a diagonal temperature profile 24, and rapid scanning perpendicular to the direction of substrate movement to provide a single line temperature profile 26 or a temperature mapping profile 28 of the substrate surface. A wide range of temperature acquisition protocols and temperature profiles can be achieved with the scanning temperature sensor configuration.

Figure 3:
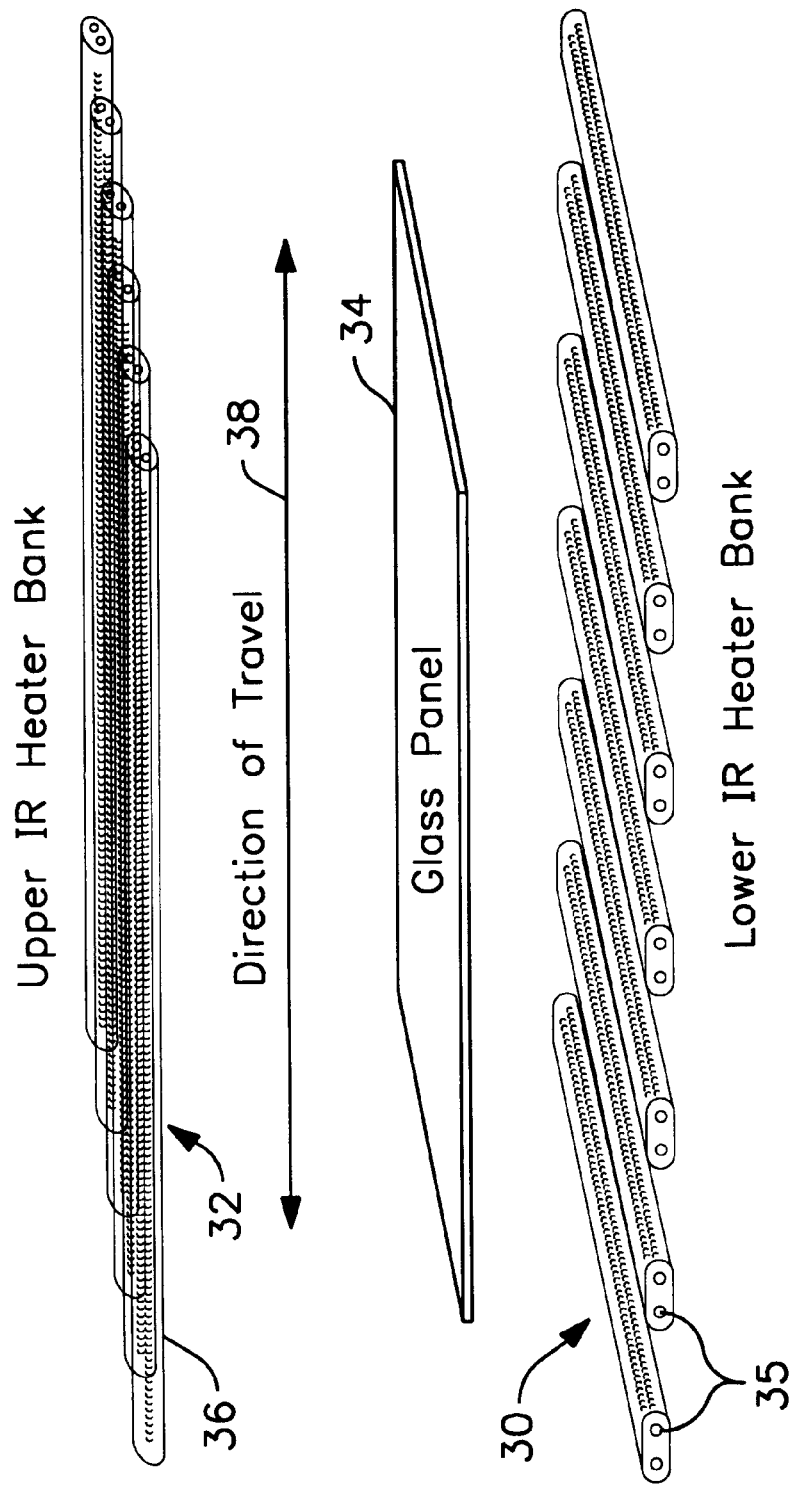
FIG. 3 is a schematic representation of a heater configuration utilizing a lower heater bank positioned below the substrate and an upper heater bank positioned above the substrate.

A rapid thermal processing system for large area substrates includes a heating assembly, which may include a first bank 30 of heating elements 35 oriented perpendicular to the direction of substrate movement and a second bank 32 of heating elements 36 oriented parallel to the direction of substrate movement, as shown in FIG. 3. The first and second banks of heating elements are located on opposite sides of the substrate 34. In one example, the heating elements 35 of the first bank 30 are positioned below the substrate, and the heating elements 36 of the second bank 32 are positioned above the substrate. The first and second banks of heating elements are preferably located at the last preheating zone of the rapid thermal processing system prior to entry of the substrate into the arc lamp region. Each of the heating elements 36 comprises an elongated infrared heating element. Preferably, the second bank 32 of heating elements comprises a number of heating elements 36 aligned parallel to the direction 38 of substrate movement and distributed across the substrate width. The second bank 32 of heating elements may extend beyond the edges of the substrate 34 for improved temperature uniformity. The heating elements 36 of second bank 32 are preferably about the length of the substrate or greater for best temperature uniformity.

Figure 2A:
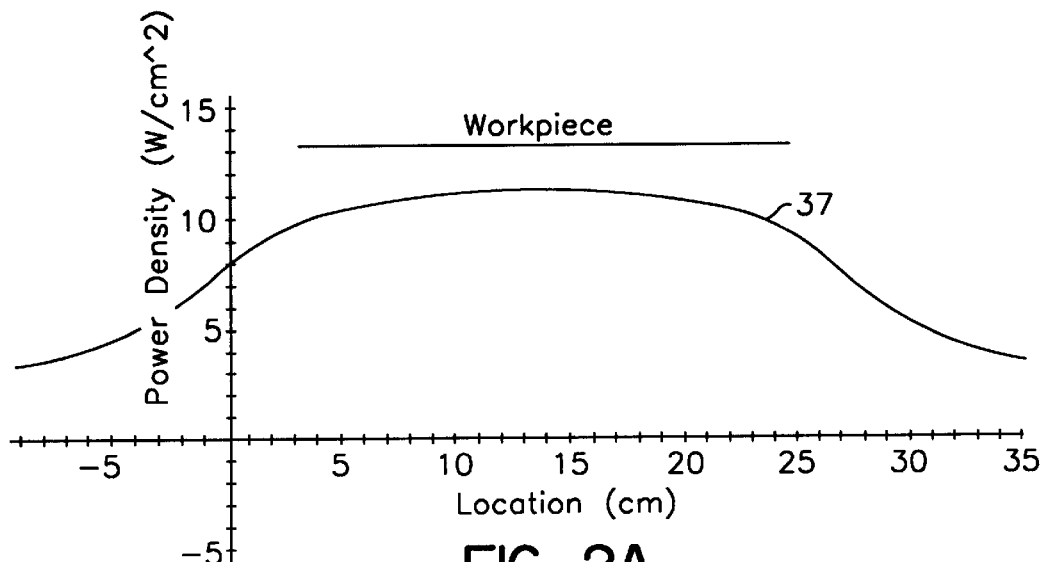
FIG. 2A is a graph of power density as a function of lateral location, showing a power density profile in accordance with the prior art.
Figure 2B:
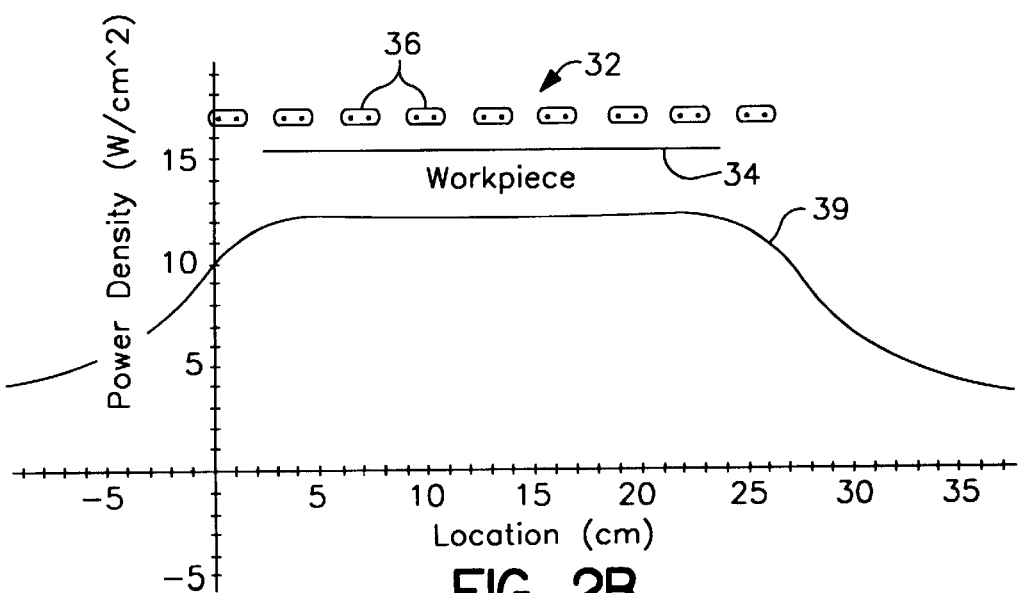
FIG. 2B is a graph of power density as a function of lateral location, showing a power density profile with heater elements positioned parallel to the direction of substrate movement.

FIG. 2A shows a lateral power density profile 37 at the substrate without the second bank 32 of heating elements. FIG. 2B shows a lateral power density profile 39 at the substrate with the second bank 32 of heating elements. It may be observed that the power density profile of FIG. 2B is more uniform over the width of substrate 34 than that of FIG. 2A.

In a preferred embodiment, the second bank heating elements are individually controlled, so that the amount of infrared energy applied to each point on the substrate can be actively and independently controlled. The control of the second bank heating elements can be static or can be dynamic during thermal processing. The scanning pyrometer described above may be used to sense substrate temperature and to provide control signals to the second bank heating elements.

Figure 4:
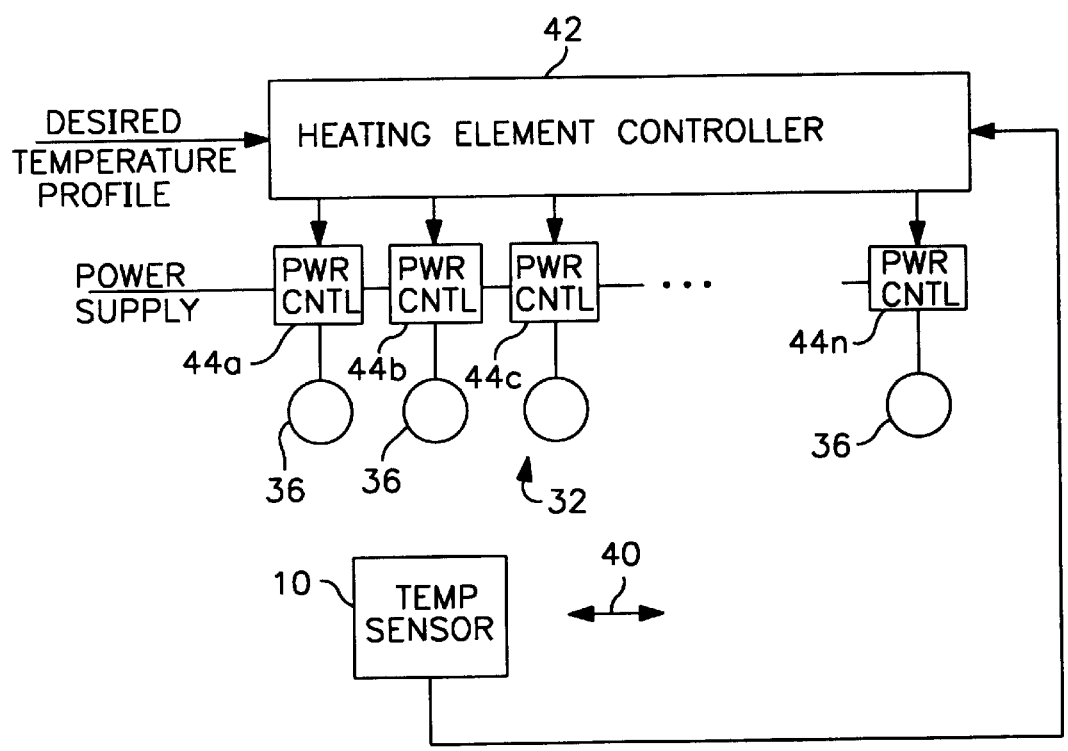
FIG. 4 is a block diagram of a feedback system for controlling the individual heating elements of the upper heater bank using the scanning temperature sensor.

An example of a feedback control system for individually controlling heating elements 36 of second bank 32 is shown in FIG. 4. Temperature sensor 10 is scanned in a direction 40 lateral to the direction of substrate movement. As described above, heating elements 36 are oriented parallel to the direction of substrate movement. Thus, temperature sensor 10 obtains a lateral temperature profile. The output of temperature sensor 10 is provided to a heating element controller 42. Power controllers 44a, 44b, 44c, etc. control the power supplied to the individual heating elements 36 of second bank 32. Power controllers 44a, 44b, 44c, etc. are controlled by heating element controller 42 to obtain a desired lateral power density profile or lateral temperature profile. The measured temperature profile may be compared with a desired temperature profile, and the power supplied to the individual heating elements 36 may be adjusted to reduce differences between the desired temperature profile and the measured temperature profile. For example, when the measured temperature at the left side of the substrate is less than the desired temperature, heating element controller 42 may adjust power controllers 44a and 44b to supply additional power to the respective heating elements 36 at the left side.

Figure 5:
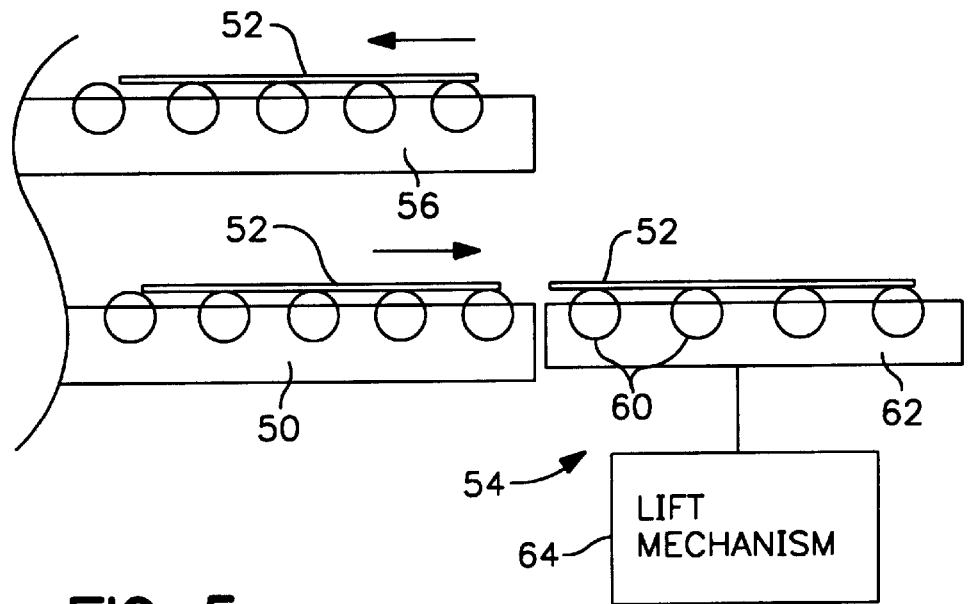
FIG. 5 is a schematic representation of a rapid thermal processing system incorporating a substrate return assembly, showing the substrate reverser in the lowered position.
Figure 6:
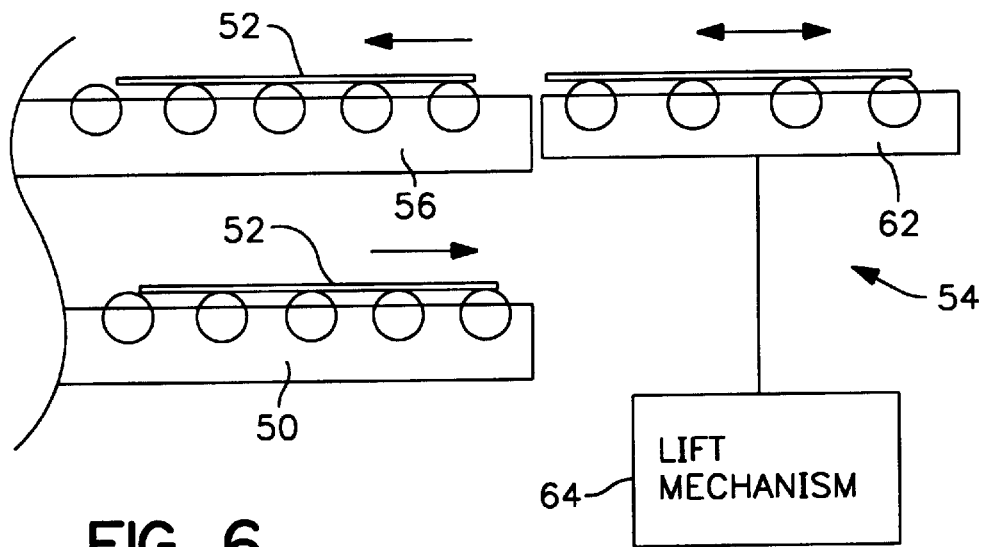
FIG. 6 is a schematic representation of a rapid thermal processing system incorporating a substrate return assembly, showing the substrate reverser in the raised position.
Figure 7:
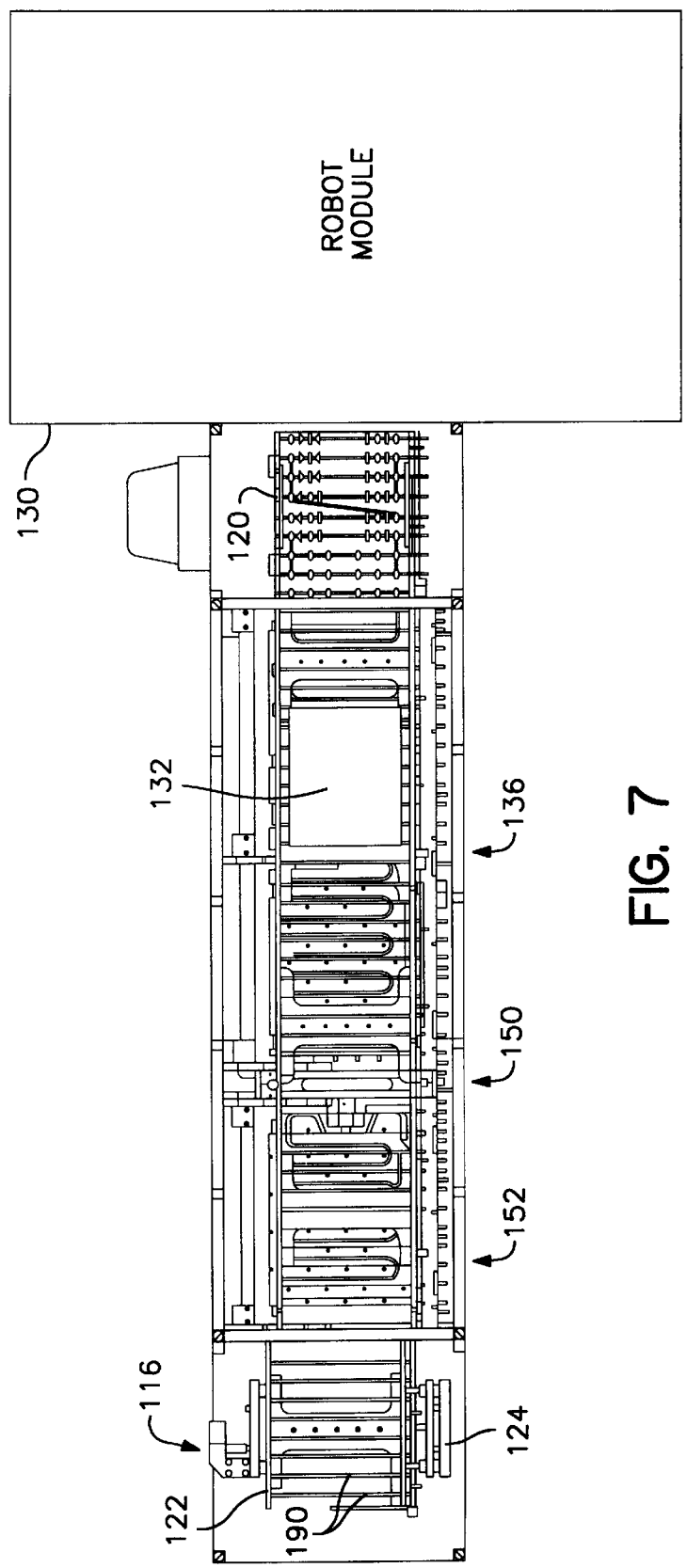
FIG. 7 is a cross-sectional top view of an example of a rapid thermal processing system.
Figure 8:
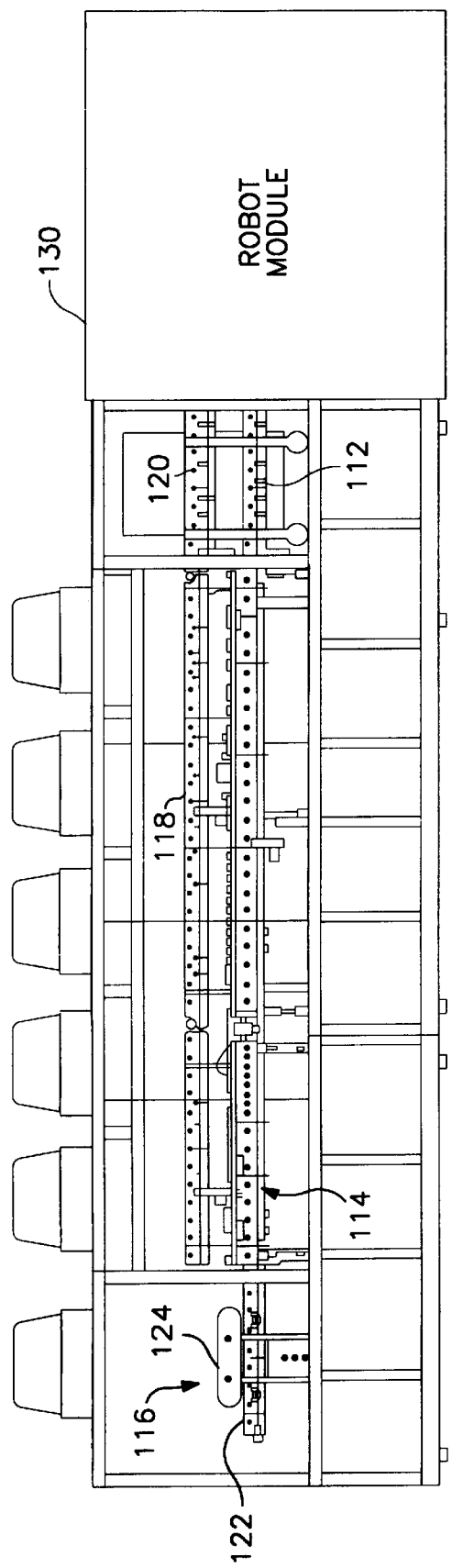
FIG. 8 is a schematic cross-sectional elevation view of the rapid thermal processing system.

A rapid thermal processing system for large area substrates may include a substrate return assembly for returning the substrates to a common loading/unloading zone for unloading. As shown in FIGS. 5 and 6, a substrate transport assembly for a rapid thermal processing system may include a feed conveyor 50 for moving substrates 52 through one or more processing zones, and a substrate return assembly. The substrate return assembly may include a substrate reverser 54 and a return conveyor 56. The substrate reverser 54 may include a substrate support 62 and a lift mechanism 64 for moving the substrate support 62 between the feed conveyor 50 and the return conveyor 56. The substrate reverser 54 is located at the downstream end of the feed conveyor 50 and receives the substrates after completion of processing. The substrate support 62 may include a series of quartz rollers 60 which support the substrate and may be rotated in either direction. The substrate reverser may further include a substrate sensor and one or more stops for limiting substrate movement. The return conveyor 56 may be located, for example, above the feed conveyor 50 and extends from the downstream end of the feed conveyor to the loading/unloading zone. Following completion of thermal processing, the substrate is moved from feed conveyor 50 onto the substrate support 62. The substrate support 62 is then lifted by lift mechanism 64 into alignment with the return conveyor 56. During movement of the substrate support 62 between the feed conveyor 50 and the return conveyor 56, the quartz rollers 60 may be activated to continuously move the substrate 52 back and forth and thereby avoid large temperature gradients which could potentially damage the substrate. When the substrate support 62 is aligned with the return conveyor 56, the rollers 60 are activated to move the substrate 52 onto the return conveyor 56, and the return conveyor 56 transports the substrate to the loading/unloading zone. The feed conveyor 50 and the return conveyor 56 thus transport substrates in opposite directions. In one embodiment, lift mechanism 64 comprises a crank mechanism for moving substrate support 62 between feed conveyor 50 and return conveyor 56. However, a variety of different lift mechanisms known to those skilled in the art may be utilized.

It will be understood that the return conveyor may have any convenient location relative to the feed conveyor. For example, the return conveyor may be located below the feed conveyor or on either side of the feed conveyor. Thus, the substrate return assembly provides a mechanism for returning the substrate to a common loading/unloading zone.

A robot at the loading/unloading zone transfers substrates from a cassette or other holder onto the feed conveyor for processing by the rapid thermal processing system. After completion of processing, the robot transfers the substrates from the return conveyor into the cassette.

An example of an implementation of a rapid thermal processing system incorporating the features described above is shown in FIGS. 7–13. Like elements in FIGS. 7–13 have the same reference numerals. A rapid thermal processing system 110 includes a substrate transport assembly comprising an input conveyor 112, a feed conveyor 114, a substrate reverser 116, a return conveyor 118 and an output conveyor 120. Each of the conveyors may include driven rollers fabricated of quartz or other temperature resistant material. Substrate reverser 116 includes a substrate support 122 and a crank mechanism 124. A robot module 130 transfers glass panels from a holder onto input conveyor 112. The glass panels, such as glass panel 132, are transported through the processing chamber by feed conveyor 114. When the glass panel 132 reaches substrate reverser 116, substrate support 122 is lifted by crank mechanism 124 to the level of return conveyor 118, and the glass panel is returned on the return conveyor 118 to output conveyor 120. The robot module 130 removes glass panel 132 from output conveyor 120 and replaces it in the holder.

Figure 9:
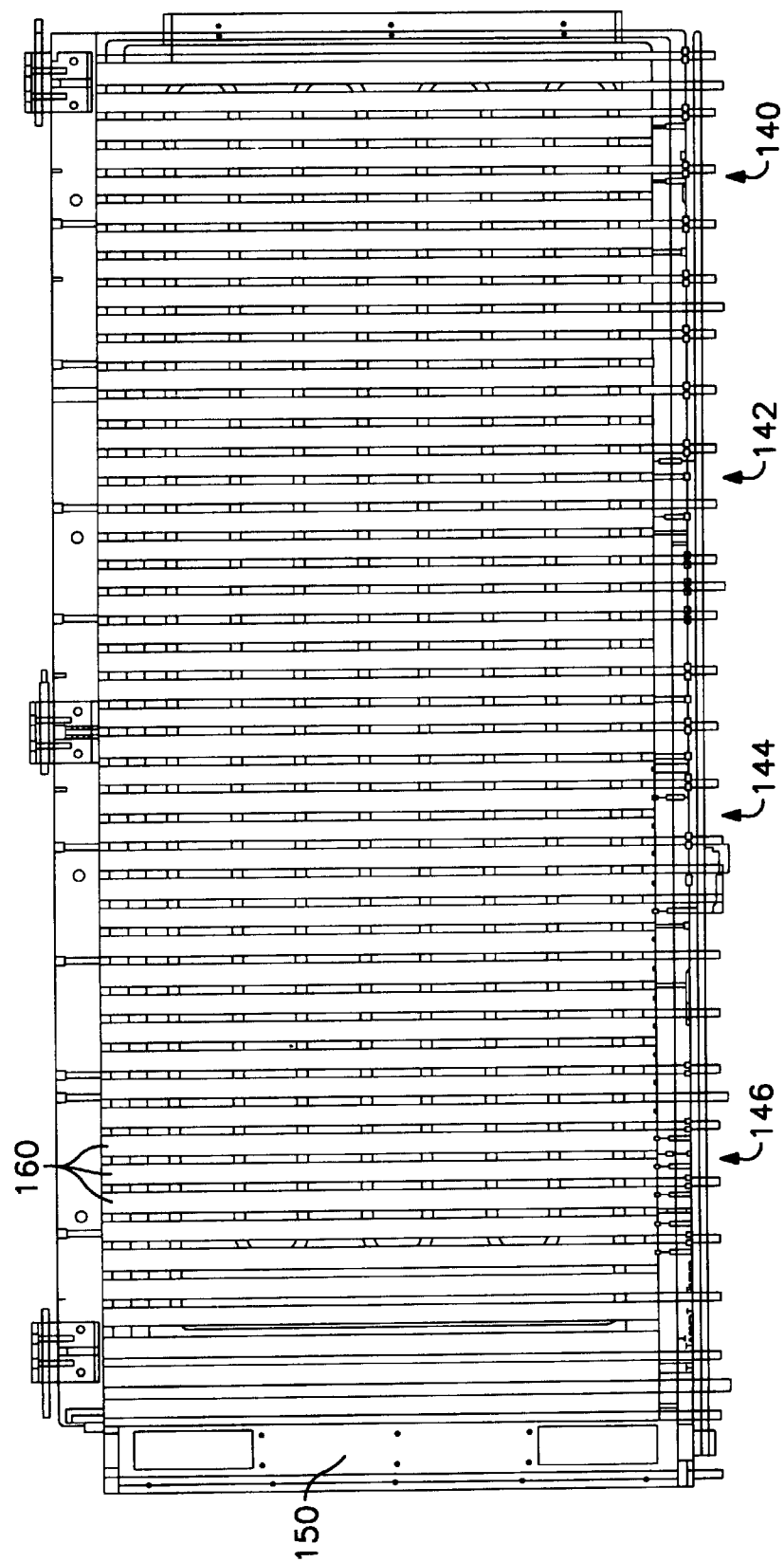
FIG. 9 is a top view of the heaters located below the substrate in the preheating zones of the rapid thermal processing system.
Figure 10:
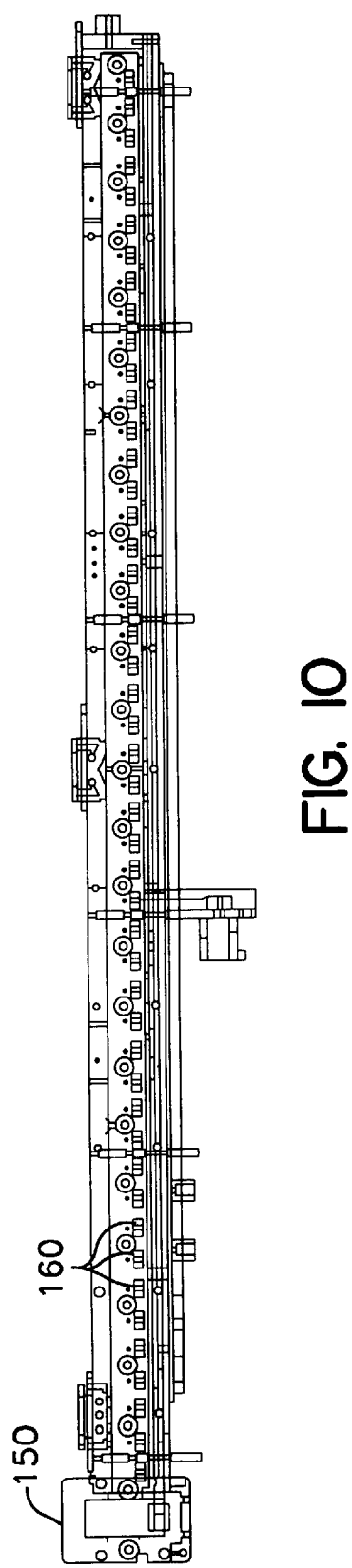
FIG. 10 is a side view of the heaters shown in FIG. 9.
Figure 11:
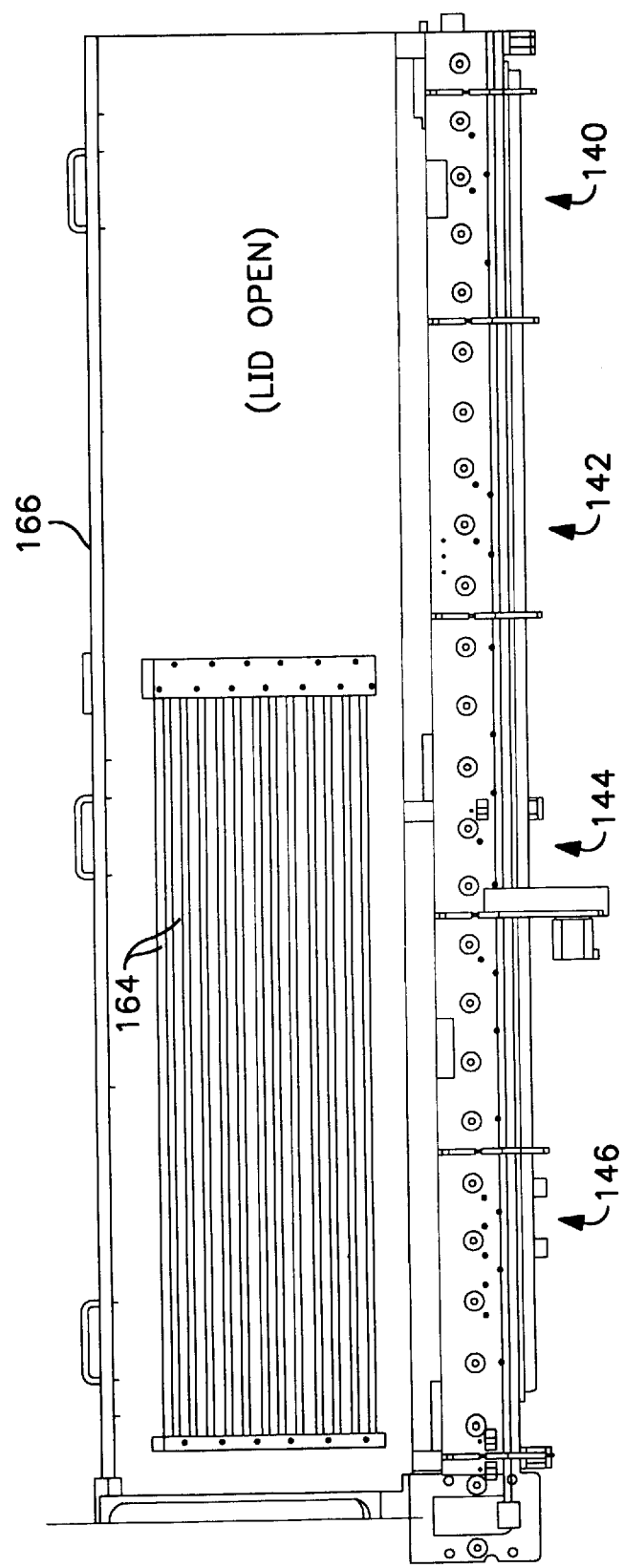
FIG. 11 is a side view of the preheating zones with the lid open, showing the heating elements disposed parallel to the direction of substrate movement.

The processing chamber includes a pre-process chamber 136 comprising preheating zones 140, 142, 144 and 146 (FIGS. 9 and 11), an arc lamp region 150 and a cooling zone 152. In the pre-process chamber 136, first banks of elongated heating elements 160 are positioned below the substrate and are oriented perpendicular to the direction of substrate movement. The heating elements 160 are located between adjacent rollers of the feed conveyor 114. The preheating zones further includes a second bank of heating elements 164 (shown in FIG. 11), positioned above the substrate and oriented parallel to the direction of substrate movement. In the example of FIG. 11, heating elements 164 extend from preheating zone 142 to 146. By way of example, heating elements 164 can be infrared heaters which operate at 480 volts and 1670 watts, and are 1300 millimeters long. Twelve heating elements may be utilized. In FIG. 11, a lid 166 is opened upwardly to show heating elements 164. In FIGS. 9–11, heating elements 160 correspond to first bank 30 shown in FIG. 3, and heating elements 164 correspond to second bank 32. Heating elements 160 and 164 and the arc lamp in arc lamp region 150 constitute a heating assembly for controlled heating of the substrate.

A scanning pyrometer may be positioned at the downstream end of preheating zone 146 just prior to the arc lamp region. The scanning pyrometer views the substrate from below through a slot. The scanning, or pre-process, pyrometer may be located as shown in FIG. 13 at 180. In the system of FIGS. 7–13, the scanning pyrometer is movable in one dimension transverse to the direction of substrate movement. By way of example, the scanning pyrometer may view a spot size of 0.25 inch at a distance of 6 inches, may have a frequency range of 8–14 micrometers and a temperature range of 200 to 1000° C. The system may also utilize a fixed process pyrometer 182 which views the substrate in the arc lamp region.

The substrate reverser 116 is located at the downstream end of the feed conveyor 114 and the return conveyor 118. The substrate support 122 may include a plurality of driven quartz rollers 190 which may be rotated in either direction. The substrate moves from feed conveyor 114 onto substrate support 122, and the substrate support 122 is rotated by crank mechanism 124 into alignment with return conveyor 118. It will be understood that different mechanisms may be utilized for moving the substrate support 122 between the feed conveyor 114 and the return conveyor 118. The return conveyor 118 returns the substrate to the output conveyor 120 for unloading by robot module 130. As a result, loading and unloading of substrates is performed at one location in the rapid thermal processing system. This may be advantageous in providing clean room access to the rapid thermal processing system.

Figure 12:
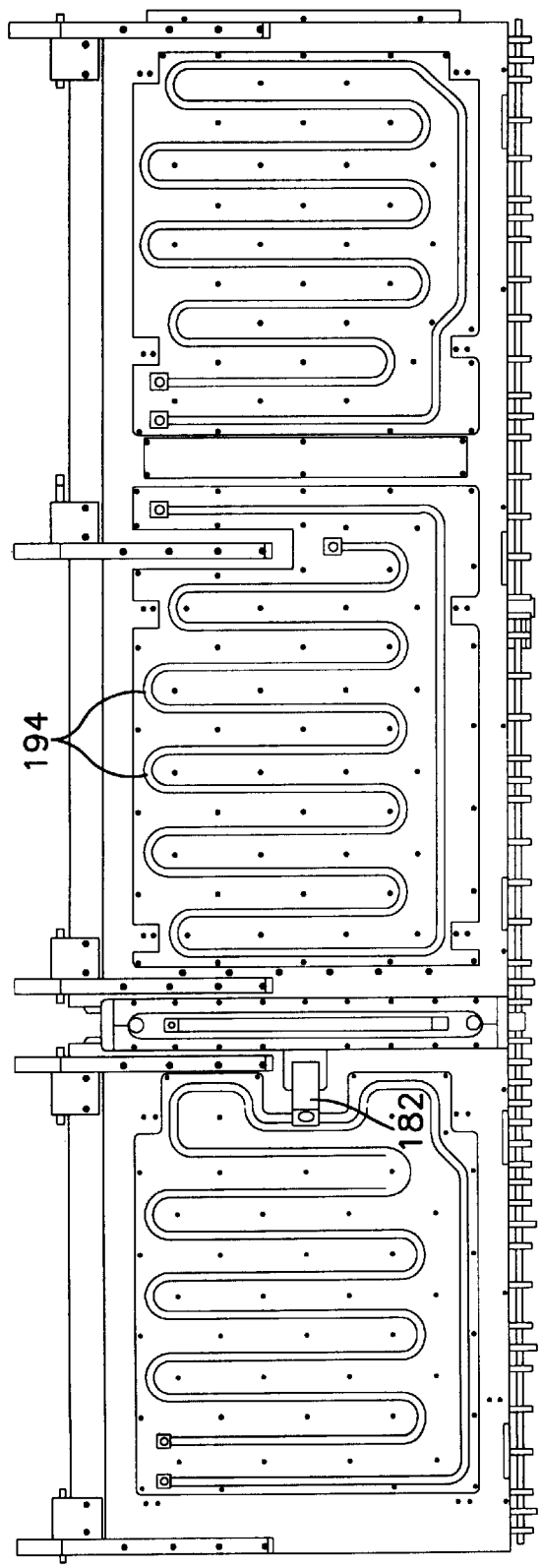
FIG. 12 is a top view of the rapid thermal processing system, illustrating the scanning pyrometer location.
Figure 13:
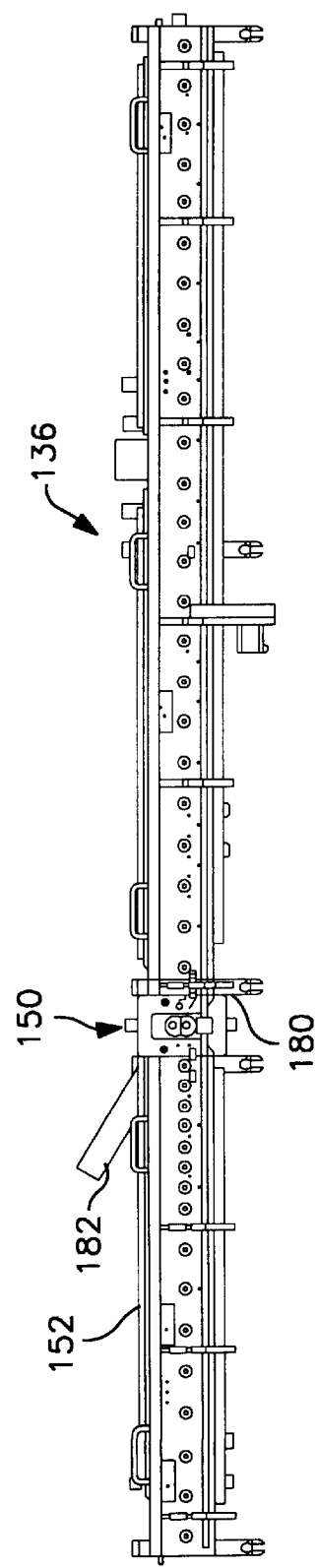
FIG. 13 is a side view of FIG. 12.

As shown in FIG. 12, the processing system includes a cooling assembly including tubes 194 for circulation of a cooling fluid.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A rapid thermal processing system for large area substrates, comprising:
   a processing chamber;
   a transport assembly for transporting a substrate through said processing chamber in a substrate transport direction and out of said chamber in a reverse direction through a folded transport path; and a heating assembly positioned at a last preheat zone in said processing chamber for heating the substrate passing through said chamber, said heating assembly comprising a first bank of elongated heating elements disposed in said processing chamber, said heating elements of said first bank having longitudinal axes aligned with the substrate transport direction and parallel thereto, said heating assembly also comprising a second bank of elongated heating elements disposed in said processing chamber positioned in a facing relationship to said first bank of heating elements and on the opposite side of a substrate when present in said processing chamber, said banks of elongated elements being arranged perpendicular to each other, and said first bank having heating elements that extend beyond the width on each side of a substrate being transported through said processing chamber, a relatively narrow arc lamp region when compared to said last preheating zone following said last preheating zone in the direction of travel of a substrate on said transport assembly to scan a substrate with ultraviolet light for controlled heating of the substrate, and a cooling zone comprising tubes for circulation of a cooling fluid.

2. A rapid thermal processing system as defined in claim 1 wherein said heating elements comprise infrared heaters.

3. A rapid thermal processing system as defined in claim 1 wherein the substrate has a length in the substrate transport direction and wherein said heating elements have lengths equal to or greater than the length of the substrate in the substrate transport direction.

4. A rapid thermal processing system as defined in claim 1 further comprising a control system for supplying controlled electrical energy to said heating elements to control the heat across the surface of a substrate passing through said processing system.

5. A rapid thermal processing system as defined in claim 4 wherein said control system comprises means for individually controlling the electrical energy supplied to each of said heating elements.

6. A rapid thermal processing system as defined in claim 4 wherein said control system comprises a temperature sensor for sensing a temperature of the substrate and a heating element controller for supplying electrical energy to said heating elements in response to a difference between the sensed temperature profile of the substrate and a desired temperature profile of the substrate.

7. A rapid thermal processing system as defined in claim 6 wherein said temperature sensor comprises means for sensing temperatures of the substrate at positions corresponding to each of said heating elements and wherein said heating element controller comprises means for individually controlling each of said heating elements in response to the corresponding sensed temperature.

* * * * *